US008891614B2

(12) United States Patent
Nandy et al.

(10) Patent No.: US 8,891,614 B2
(45) Date of Patent: Nov. 18, 2014

(54) METHOD AND SYSTEM ON CHIP (SOC) FOR ADAPTING A RUNTIME RECONFIGURABLE HARDWARE TO DECODE A VIDEO STREAM

(75) Inventors: Soumitra Kumar Nandy, Karnataka (IN); Ranjani Narayan, Karnataka (IN); Mythri Alle, Hyderabad (IN); Keshavan Vardarajan, Karnataka (IN); Alexander Fell, Kreuzau (DE); Adarsha Rao, Karnataka (IN); Ramesh Reddy, Andhra Pradesh (IN); Nimmy Joseph, Kerala (IN)

(73) Assignee: Morphing Machines PVT Ltd, Bangalore (IN)

( * ) Notice: Subject to any disclaimer, the term of this patent is extended or adjusted under 35 U.S.C. 154(b) by 739 days.

(21) Appl. No.: 13/002,330

(22) PCT Filed: Jun. 26, 2009

(86) PCT No.: PCT/IN2009/000366
§ 371 (c)(1),
(2), (4) Date: Dec. 31, 2010

(87) PCT Pub. No.: WO2010/001411
PCT Pub. Date: Jan. 7, 2010

(65) Prior Publication Data
US 2011/0134996 A1 Jun. 9, 2011

(30) Foreign Application Priority Data
Jul. 1, 2008 (IN) .......................... 1593/CHE/2008

(51) Int. Cl.
*H04N 7/12* (2006.01)
*H04N 11/02* (2006.01)
*H04N 19/61* (2014.01)
*H04N 19/44* (2014.01)
*H04N 19/42* (2014.01)
*H04N 19/12* (2014.01)

(52) U.S. Cl.
CPC ........... *H04N 7/50* (2013.01); *H04N 19/00533* (2013.01); *H04N 19/00478* (2013.01); *H04N 19/00781* (2013.01); *H04N 19/00078* (2013.01)
USPC .................................................... 375/240.02

(58) Field of Classification Search
CPC .................. H04N 19/00533; H04N 19/00478; H04N 19/00781; H04N 19/00078
USPC ................. 375/240.02; 713/1, 375, 600, 502; 712/15
See application file for complete search history.

(56) References Cited

U.S. PATENT DOCUMENTS

| 7,779,380 | B2 * | 8/2010 | Honda | 716/103 |
| 8,136,076 | B2 * | 3/2012 | Bachina et al. | 716/126 |
| 2005/0259688 | A1 * | 11/2005 | Gordon | 370/477 |
| 2009/0031106 | A1 * | 1/2009 | Honda | 712/29 |
| 2009/0187756 | A1 * | 7/2009 | Nollet et al. | 713/100 |

FOREIGN PATENT DOCUMENTS

EP 1292154 A 3/2003

OTHER PUBLICATIONS

PCT International Search Report dated Jun. 25, 2012, PCT Application No. PCT/IN2009/000366.

* cited by examiner

*Primary Examiner* — Anner Holder
(74) *Attorney, Agent, or Firm* — Timberline Patent Law Group PLLC

(57) ABSTRACT

A method and System on Chip (SoC) for adapting a runtime reconfigurable hardware to decode a video stream, wherein the video stream is of one of a plurality of video types is disclosed. The method includes determining a video type of the video stream and identifying at least one functional block of a set of functional blocks in the runtime reconfigurable hardware in response to determining the video type. A functional block of the set of functional blocks corresponds to a decoding sub function of the video type. Thereafter, the method configures the one or more functional block based on a plurality of configuration parameters of the video type. Further, the method decodes the video stream using the one or more functional blocks in response of configuring the one or more functional block.

13 Claims, 8 Drawing Sheets

METHOD AND SYSTEM ON CHIP (SOC) FOR ADAPTING A RUNTIME RECONFIGURABLE HARDWARE TO DECODE A VIDEO STREAM

RELATED APPLICATIONS

This application is a national stage application under 35 U.S.C. §371 of, claims the benefit of priority of, and incorporates in its entirety, PCT Application Number PCT/IN2009/000366 (Publication Number WO/2010/001411) filed on 26 Jun. 2009, which claims the benefit of and incorporates in its entirety Indian Patent Application Number 1593/CHE/2008 filed on 1 Jul. 2008.

FIELD OF THE INVENTION

The invention relates generally to methods and apparatus for a configurable Application Specific Integrated Circuit (ASIC). More specifically, the invention relates to methods and System on Chip (SoC) for adapting runtime reconfigurable hardware to decode a video stream.

BACKGROUND OF THE INVENTION

Embedded systems support a plethora of applications in various domains including, but not limited to, communications, multimedia, and image processing. Such a vast range of applications require flexible computing platforms for different needs of each application and derivatives of each application. General purpose processors are good candidates to support the vast range of applications due to the flexibility they offer. However, general purpose processors are unable to meet the stringent performance, throughput and power requirements of the applications hosted on embedded systems.

A commonly employed solution to meet the stringent performance, throughput and power requirements is the use of Application Specific Integrated Circuit (ASIC) solutions. ASICs enable hardware acceleration of an application by hard coding the functions onto hardware to satisfy the performance and throughput requirements of the application. However, the gain in increased performance and throughput through the use of ASICs is at the loss of flexibility.

Therefore, the hard coded design model of ASICs does not meet changing market demands and multiple emerging variants of applications catering to different customer needs. Spinning an ASIC for every application is prohibitively expensive. The design cycle of an ASIC from concept to production typically takes about 15 months at a cost of $10-15 million. However, the time and cost may escalate further as the ASIC is redesigned and respun to conform to changes in standards, to incorporate additional features, or to match customer requirements. The increased cost may be justified if the market volume for the specific application corresponding to an ASIC is large. However, rapid evolution of technology and changing requirements of applications prohibit any one application optimized on an ASIC from having a significant market demand to justify the large costs involved in producing the ASIC.

Applications in the domain of video decoding fall under the realm of rapidly changing requirements and standards. Video decoding is used in a wide range of applications from mobile devices to high definition television (HDTV) and digital cinema. Each application caters to a different set of data sources, end terminals and processing capabilities. For example, a home-theater system may have to decode the baseline profile stream of the H.264 standard received over internet and also a high-profile stream of the H.264 standard received from a DVD. Further it is desirable to support interoperability between these applications at run time Therefore, there is a need for a method and apparatus for a hardware solution that provides application scalability and interoperability between various domain specific applications at run time.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the invention.

Figure 1:
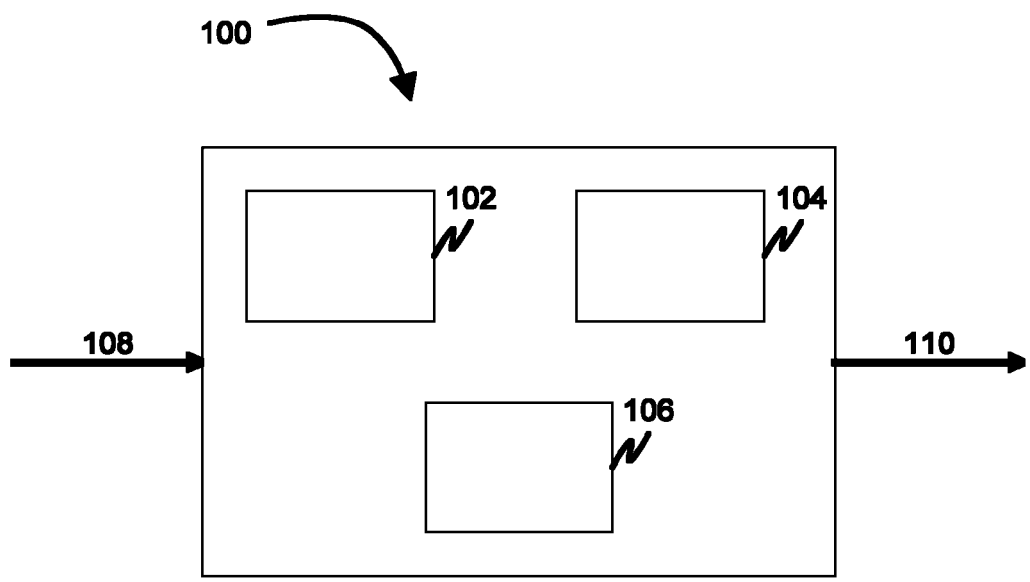
FIG. 1 illustrates a video decoder in which various embodiments of the invention may function.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION OF THE INVENTION

Before describing in detail embodiments that are in accordance with the invention, it should be observed that the embodiments reside primarily in combinations of method steps and apparatus components related to decoding a video stream by a video decoder. Accordingly, the apparatus components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments described herein may be comprised of one or more conventional processors and unique stored program instructions that control the one or more processors to implement, in conjunction with certain non-processor circuits, some, most, or all of the functions of method and apparatus for decoding a video stream by a video decoder. The non-processor circuits may include, but are not limited to, signal drivers, clock circuits, power source circuits, and user input devices.

Various embodiments of the invention provide a method and apparatus for adapting a runtime reconfigurable hardware to decode a video stream. A video type corresponding to the video stream is identified. Thereafter, one or more functional blocks corresponding to one or more decoding sub functions are identified based on the video type of the video stream. The one or more functional blocks are configured based on a plurality of configuration parameters in order to decode the video stream.

FIG. 1 illustrates a video decoder 100 in which various embodiments of the invention may function. Video decoder 100 includes a plurality of functional blocks. In order to decode a video, each of the plurality of functional blocks performs a specific decoding sub function. As depicted in FIG. 1, the plurality of functional blocks includes a functional block 102, a functional block 104, and a functional block 106. In an exemplary embodiment of the invention, functional block 102, functional block 104, and functional block 106 is one of, but not limited to a stream buffer, a bit stream parser, an entropy decoder, an inverse quantizer, an inverse transform unit, a spatial prediction unit, a motion compensation unit, an artifact filter, an image resize unit, a frame buffer, and a memory controller.

Functional block 102, functional block 104, and functional block 106 each perform a decoding sub function. The decoding sub functions performed by functional block 102, functional block 104, and functional block 106 are aggregated to decode an incoming video stream 108 in one of a plurality of video types to generate a decoded video stream 110.

Figure 2:
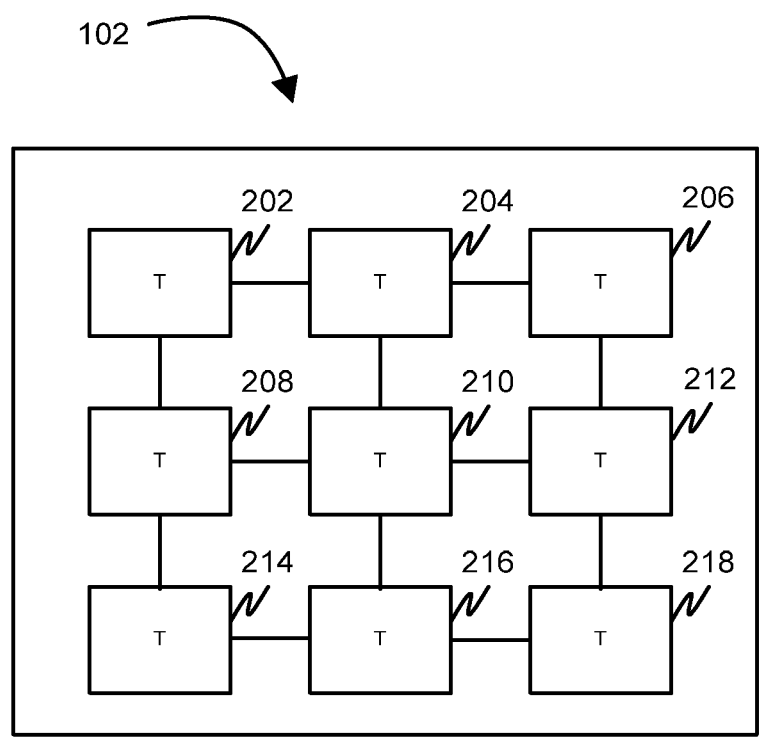
FIG. 2 illustrates architecture of a functional block of a plurality of functional blocks in accordance with an embodiment of the invention.

Turning to FIG. 2, architecture of functional block 102 is illustrated in accordance with an embodiment of the invention. For purposes of explanation, the architecture of functional block 102 of the plurality of functional blocks is described hereinafter. However, it shall be evident to a person skilled in the art that the architecture of functional block 102 illustrated hereinafter is not limited to functional block 102 but extends to include functional block 104 and functional block 106.

As depicted in FIG. 2, functional block 102 includes one or more tiles, for example a tile 202, a tile 204, a tile 206, a tile 208, a tile 210, a tile 212, a tile 214, a tile 216, and a tile 218. The number of tiles in functional block 102 depends on the decoding sub function performed by functional block 102. Each of tile 202, tile 204, tile 206, tile 208, tile 210, tile 212, tile 214, tile 216, and tile 218 perform a corresponding primitive decoding sub function of one or more primitive decoding sub functions required for executing the decoding sub function of functional block 102. In an embodiment, a functional block may have one tile if the decoding sub function to be performed by functional block 102 can be realized by employing only one tile.

In order to perform a decoding operation, interconnections are established among one or more tiles of functional block 102. These interconnections facilitate data transfer and coordination among the one or more primitive decoding sub functions of the one or more tiles. Exemplary interconnections among tile 202, tile 204, tile 206, tile 208, tile 210, tile 212, tile 214, tile 216, and tile 218 are shown in FIG. 2. As per the interconnections among the tiles shown in FIG. 2, each of the primitive sub functions are executed and data is transferred across the tiles for executing the decoding sub function of functional block 102. It will be apparent to a person skilled in the art that network topologies and hybrids of network topologies other than that illustrated in FIG. 2 may also be used. Examples of other network topologies include but are not limited to ring topologies, bus topologies, star topologies, tree topologies, and mesh topologies.

Figure 3:
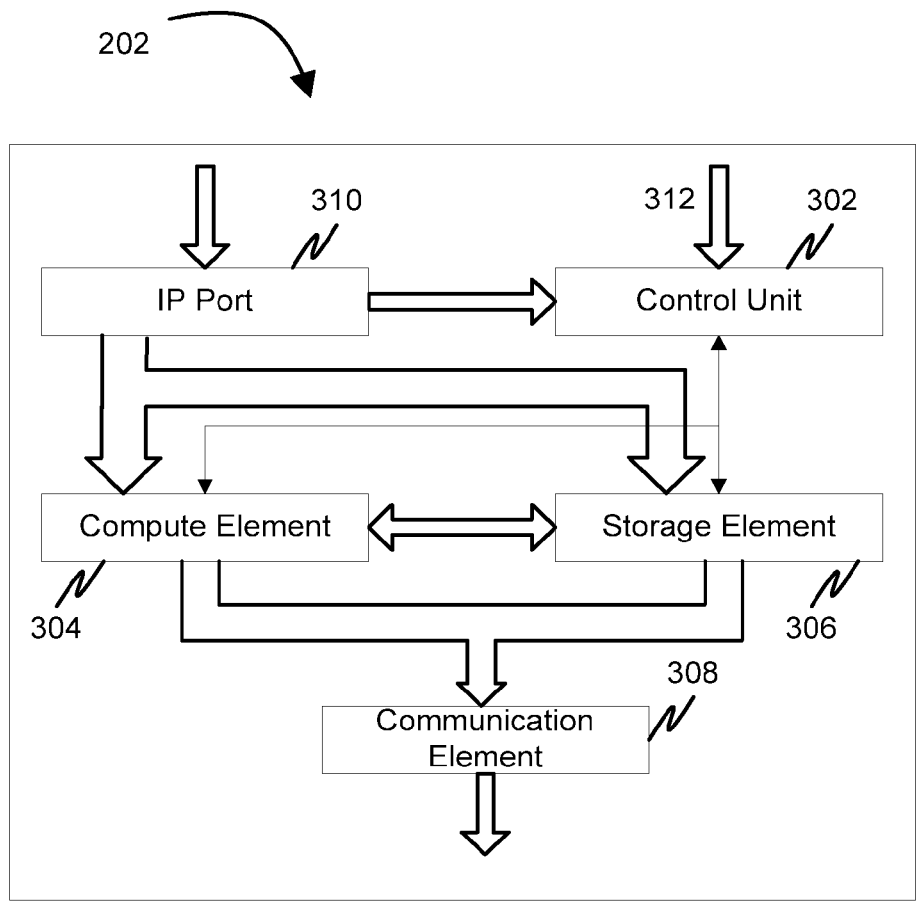
FIG. 3 illustrates architecture of a tile in accordance with an embodiment of the invention.

FIG. 3 illustrates architecture of tile 202 in accordance with an embodiment of the invention. For purposes of explanation, the architecture of tile 202 of the plurality of tiles of functional block 102 is described hereinafter. However, it shall be evident to a person skilled in the art that the architecture of tile 202 illustrated hereinafter is not limited to tile 202 but extends to include tile 204, tile 206, tile 206, tile 208, tile 210, tile 212, tile 214, tile 216, and tile 218.

Tile 202 is an aggregation of elementary hardware resources and includes one or more of one or more compute elements, one or more storage elements, and one or more communication elements. Tile 202 further includes a control unit 302. For the sake of clarity, tile 202 as illustrated in FIG. 3 illustrates one compute element 304, one storage element 306, and one communication element 308. However, it is to be noted that tile 202 may include a plurality of compute elements, a plurality of storage elements and a plurality of communication elements without deviating from the scope of the invention.

Compute element 304 is one of an Arithmetic Logic Unit (ALU) and a Functional Unit (FU) configured to execute a primitive decoding sub function of the decoding sub function. Compute element 304 processes a video stream received at an input port 310 and takes a finite number of execution cycles to execute the primitive decoding sub function. Compute element 304 may access storage element 306 during processing of the video stream by raising a request to storage element 306. Storage element 306 includes a plurality of storage banks and in an embodiment may store intermediate results produced by compute element 304. The range of storage addresses of storage element 306 available to compute element 304 is determined by a plurality of configuration parameters 312 corresponding to a video type of the video stream. Therefore, the storage element 306 can be dynamically sized based on plurality of configuration parameters 312. Plurality of configuration parameters 312 corresponding to the video type is provided to storage element 306 by control unit 302.

Control unit 302 further maintains synchronization between compute element 304 and storage element 306. Control unit 302 also facilitates communications between tile 202 and one or more of tile 204, tile 206, tile 208, tile 210, tile 212, tile 214, tile 216, and tile 218 based on plurality of configuration parameters 312. In an embodiment, control unit 302 may be realized as a Finite State Machine (FSM) or as a processor core. Other realizations of control units known in the art may also be used without deviating from the scope of the invention.

After executing the primitive sub function, compute element 304 asserts an explicit signal to indicate availability of a valid output to communication element 308. Thereafter, communication element 308 routes the valid output to one or more of tile 204, tile 206, tile 208, tile 210, tile 212, tile 214, tile 216, and tile 218 of functional block 102 based on plurality of configuration parameters 312 provided by control unit 302. Compute element 304 waits for communication element 308 to route the valid output to one or more of tile 204, tile 206, tile 208, tile 210, tile 212, tile 214, tile 216, and tile 218 before accepting further inputs thereby implementing a producer-consumer model. In an embodiment, wherein tile 202 performs the decoding sub function of functional block 102, compute element 304 waits for the valid output to be routed by communication element 308 to one or more of functional block 104 and functional block 106 before accepting further inputs.

Compute element 304 can support several compute configurations wherein each configuration is optimized for the requirements of a video type. The choice of configuration is indicated by plurality of configuration parameters 312 received by control unit 302 corresponding to the video type. Therefore, based on plurality of configuration parameters 312, compute element is configured at runtime to meet the requirements of the video type.

Figure 4:
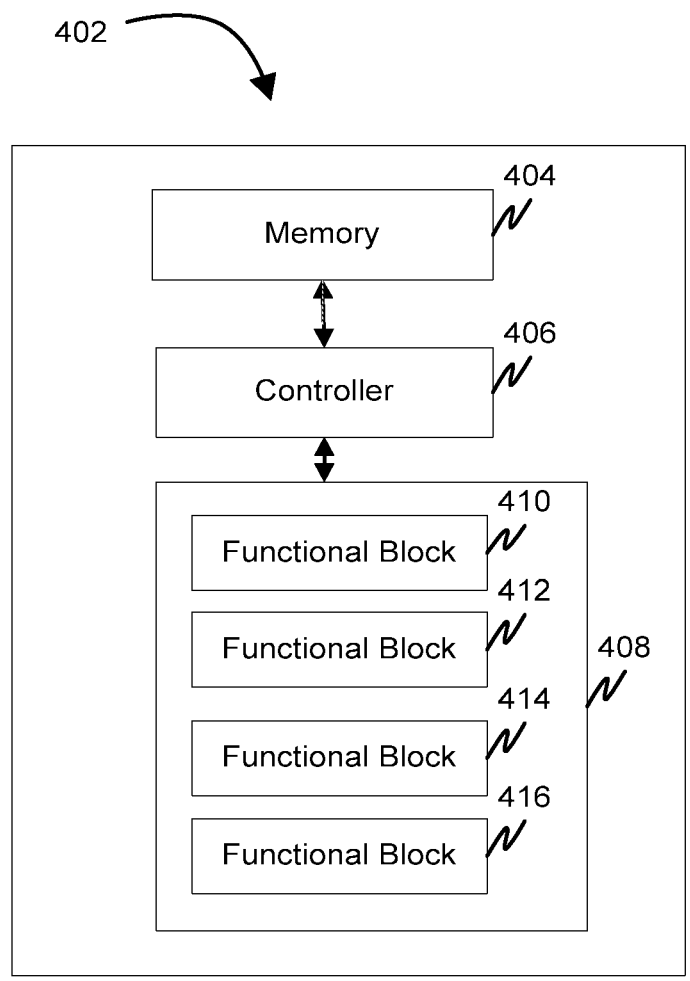
FIG. 4 illustrates a block diagram of a System on Chip (SoC) for adapting a runtime reconfigurable hardware to decode a video stream in accordance with an embodiment of the invention.

Turning now to FIG. 4, a System on Chip (SoC) 402 for adapting a runtime reconfigurable hardware to decode video stream 108 is illustrated in accordance with an embodiment of the invention. SoC 402 includes a memory 404, a controller 406 coupled to memory 404, and a set of functional blocks 408.

SoC 402 receives video stream 108 for the purpose of decoding video stream 108 using the reconfigurable hardware. Video stream 108 is one of a plurality of video types. In order to initiate the decoding of video stream 108 controller 406 determines a video type of video stream 108. The video type of video stream 108 is one of a but is not limited to MPEG1, MPEG2, MPEG4-ASP, H.263, H.264 AVC, H.264 SVC, WMV9 and M-JPEG. On determining the video type of video stream 108, controller 406 identifies one or more functional blocks of the set of functional blocks 408 required by the video type to perform a plurality of decoding sub functions for decoding video stream 108. As shown in FIG. 4, the set of functional blocks includes a functional block 410, a functional block 412, a functional block 414, and a functional block 416. It will be apparent to a person skilled in the art that the set of functional blocks may include any number of functional blocks required for performing every decoding sub function for decoding a video stream of a video type. However, for the sake of clarity only four functions blocks are shown and described in the FIG. 4. Each of functional block 410, functional block 412, functional block 414, and functional block 416 includes one or more tiles as illustrated in the description of FIG. 2.

In an exemplary embodiment, controller 406 identifies functional block 410, functional block 412, and functional block 414 of set of functional blocks 408. In response to identifying functional block 410, functional block 412, and functional block 414, controller 406 provides plurality of configuration parameters 312 (As shown in FIG. 3) corresponding to the video type of video stream 108 to each of functional block 410, functional block 412, and functional block 414. Plurality of configuration parameters 312 are input to each control unit of each tile of each of functional block 410, functional block 412, and functional block 414. Thereafter, each tile of the one or more tiles is configured by a corresponding control unit associated with each tile based on plurality of configuration parameters 312 as illustrated in the description of FIG. 3. Therefore, on providing plurality of configuration parameters 312 to each of functional block 410, functional block 412, and functional block 414 by controller 406, functional block 410, functional block 412, and functional block 414 are configured at runtime for the video type for decoding video stream 108. As explained earlier, intercommunications among one or more tiles corresponding to each functional block are modified based on plurality of configuration parameters 312. Modifying intercommunications alters the data flow path among one or more tiles of a functional block and thereby configures the functional block to perform a decoding sub function specific to a video type.

Further, plurality of configuration parameters 312 also defines intercommunications among functional block 410, functional block 412, and functional block 414 as per the requirement of functional blocks for decoding video stream 108 of the video type. Thereafter, functional block 410, functional block 412, and, functional block 414 work in conjunction with each other to decode video stream 108. In an exemplary embodiment, functional block 412 requires an input from functional block 410 for performing a decoding sub function. Therefore, an output of the functional block 410 is provided by functional block 410 to functional block 412 using an intercommunication path between functional block 410 and functional block 412. In another embodiment, functional block 410 may save the output in memory 404 of SoC 402. Thereafter, functional block 412 may retrieve the output of functional block 410 from memory 404 when required by the functional block 412. Controller 406 may provide information regarding availability of an input/output to functional block 410, functional block 412, and functional block 414

Therefore, with the modifications of the intercommunications among one or more tiles corresponding to each functional block and the intercommunications among one or more functions blocks based on plurality of configuration parameters 312, the hardware is configured to decode video stream 108 of the video type.

Figure 5:
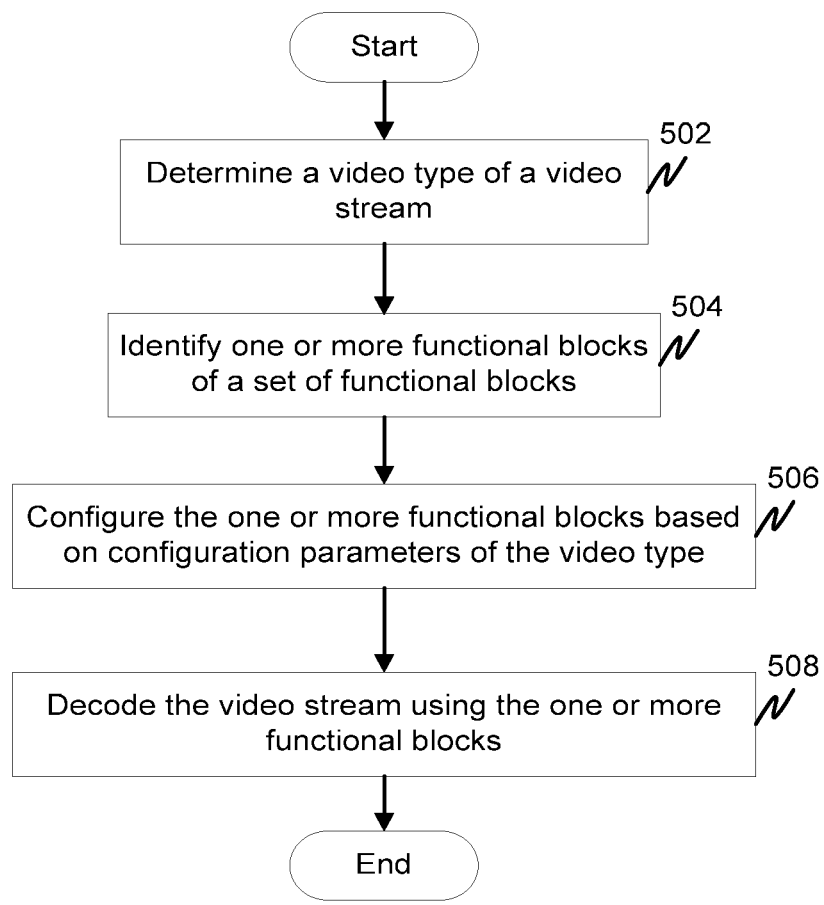
FIG. 5 illustrates a flow chart of a method of adapting a runtime reconfigurable hardware to decode a video stream in accordance with an embodiment of the invention.

FIG. 5 illustrates a flow chart of a method for adapting a runtime reconfigurable hardware to decode a video stream in accordance with an embodiment of the invention. In order to decode a video stream, video decoder 102 receives a video stream for the purpose of decoding the video stream using the reconfigurable hardware. The video stream is one of a plurality of video types. In order to initiate the decoding of video stream the video type of the video stream is determined at step 502. The video type of the video stream is one of a but is not limited to MPEG1, MPEG2, MPEG4-ASP, H.263, H.264 AVC, H.264 SVC, WMV9 and M-JPEG.

On determining the video type, at step 504, one or more functional blocks of a set of functional blocks are identified. Each functional block of the one or more functional blocks executes a decoding sub function associated with decoding the video stream. The decoding sub functions executed by the one or more functional blocks are aggregated to decode the video stream. A functional block of the set of functional blocks is one of a but not limited to a stream buffer, a bit stream parser, an entropy decoder, an inverse quantizer, an inverse transform unit, a spatial prediction unit, a motion compensation unit, an artifact filter, an image resize unit, a frame buffer, and a memory controller.

In an embodiment, each functional block includes one or more tiles. A tile of a functional block is an aggregation of elementary hardware resources and includes one or more of one or more compute elements, one or more storage elements, and one or more communication elements. The tile of the functional block further includes a control unit for independently configuring and controlling functioning of the tile. The one or more compute elements of the tile execute one or more primitive sub functions of the decoding sub function of the functional block. Further, the one or more compute elements may access the one or more storage elements to store intermediate results of the execution of the one or more primitive sub functions. Thereafter, the one or more communication elements routes a valid output of the execution to one or more tiles. In an embodiment, a functional block may have one tile if the decoding sub function to be performed by the functional block can be realized by employing only one tile.

Thereafter, to perform a decoding operation the one or more functional blocks are configured based on a plurality of configuration parameters at step 506. The plurality of configuration parameters is associated with the video type. In order to configure the one or more functional blocks, intercommunications among one or more tiles corresponding to each functional block is modified based on the plurality of configuration parameters. Modifying intercommunications alters the data flow path among one or more tiles of a functional block and thereby configure the functional block to perform a decoding sub function specific to a video type. Further, the one or more storage elements are dynamically sized based on the plurality of configuration parameters of the video type. Dynamically sizing the one or more storage elements includes setting a range of storage addresses accessible to the one or more compute elements based on the plurality of configuration parameters. Thereafter, intercommunications among the one or more functional blocks are also modified based the plurality of configuration parameters to dynamically alter the data flow path among the one or more functional blocks as per the requirement of functional blocks for decoding the video stream of the video type.

On configuring the one or more functional blocks, at step 508, the video stream is decoded using the one or more functional blocks.

Figure 6:
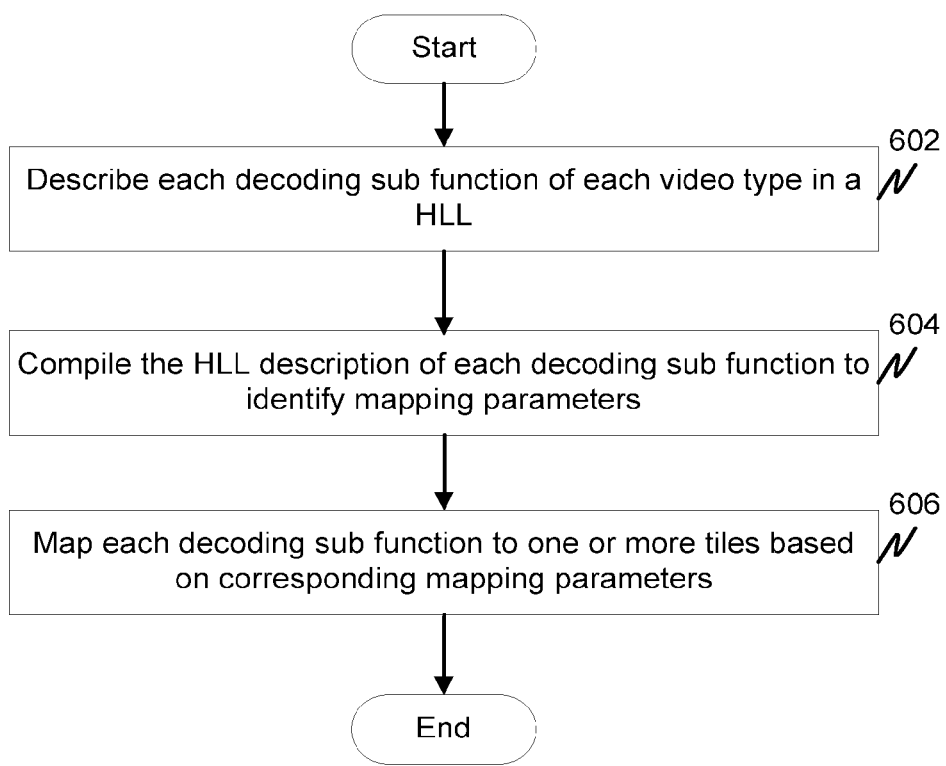
FIG. 6 illustrates a flow chart of a method of configuring hardware to decode a video stream in accordance with an embodiment of the invention.

FIG. 6 illustrates a flow chart of a method of configuring hardware to decode a video stream in accordance with an embodiment of the invention. The video stream is of one of a plurality of video types. At step 602, each decoding sub function corresponding to the plurality of video types is described in a high level language (HLL). Examples of HLL include but are not limited to C and Java. Thereafter, at step 604 the HLL description of each decoding sub function is compiled to identify a plurality of mapping parameters corresponding to each decoding sub function. The plurality of mapping parameters describes functionality and data flow path of a decoding sub function.

On compiling the HLL description, at step 606, each decoding sub function is mapped to hardware based on corresponding mapping parameters. The hardware comprises one or more tiles. Each tile of the one or more tiles comprises one or more of one or more compute elements, one or more storage elements and one or more communication elements. In an embodiment, a tile performs a primitive decoding sub function based on a configuration of a compute element of the tile. Therefore, each decoding sub function may be mapped to one or more tiles in the hardware for performing a corresponding decoding sub function. The one or more tiles are identified based on one or more primitive functions required for performing a decoding sub function. The one or more tiles corresponding to each decoding sub function work in conjunction with each other to perform the one or more decoding sub functions to decode the video stream.

Figure 7A:
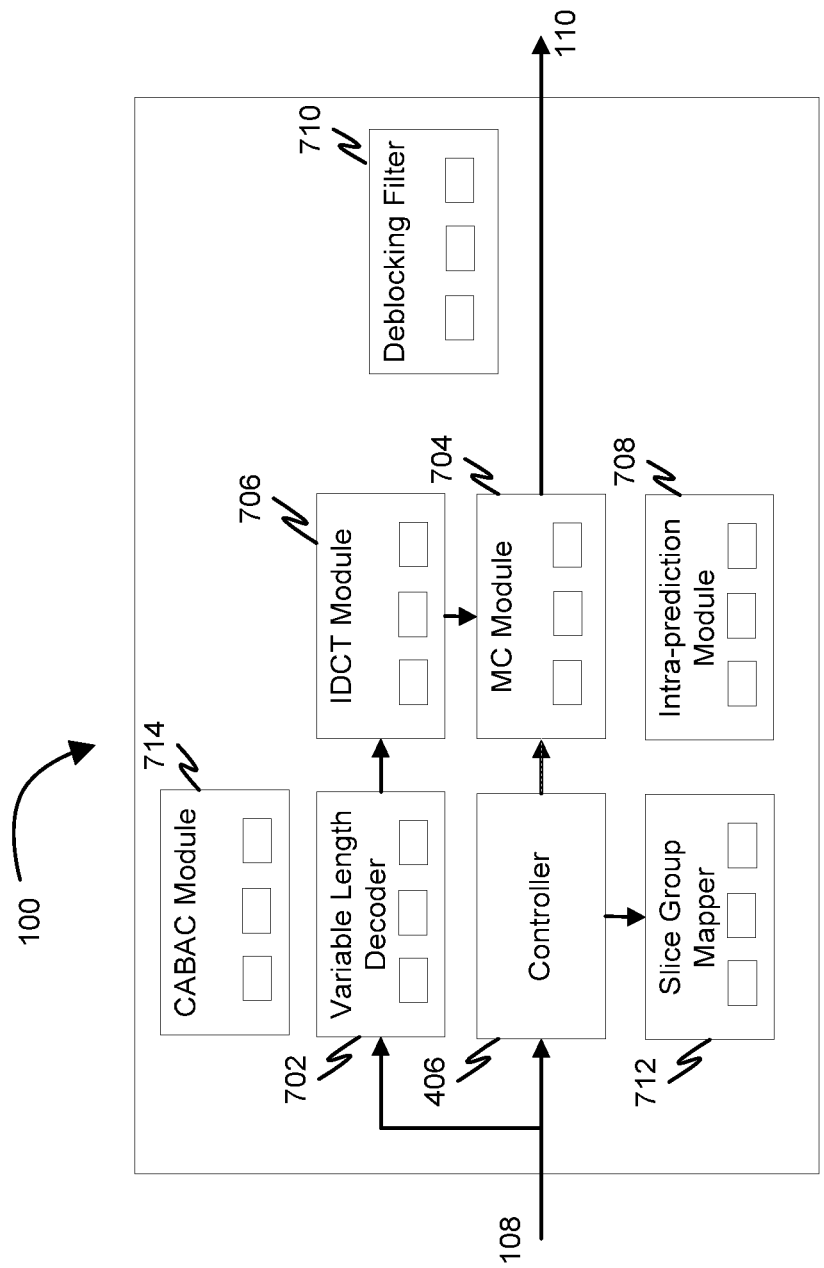
FIG. 7A and FIG. 7B illustrates an exemplary embodiment of a runtime transition from decoding a video stream of MPEG2 video type to a video stream of H.264 video type.
Figure 7B:
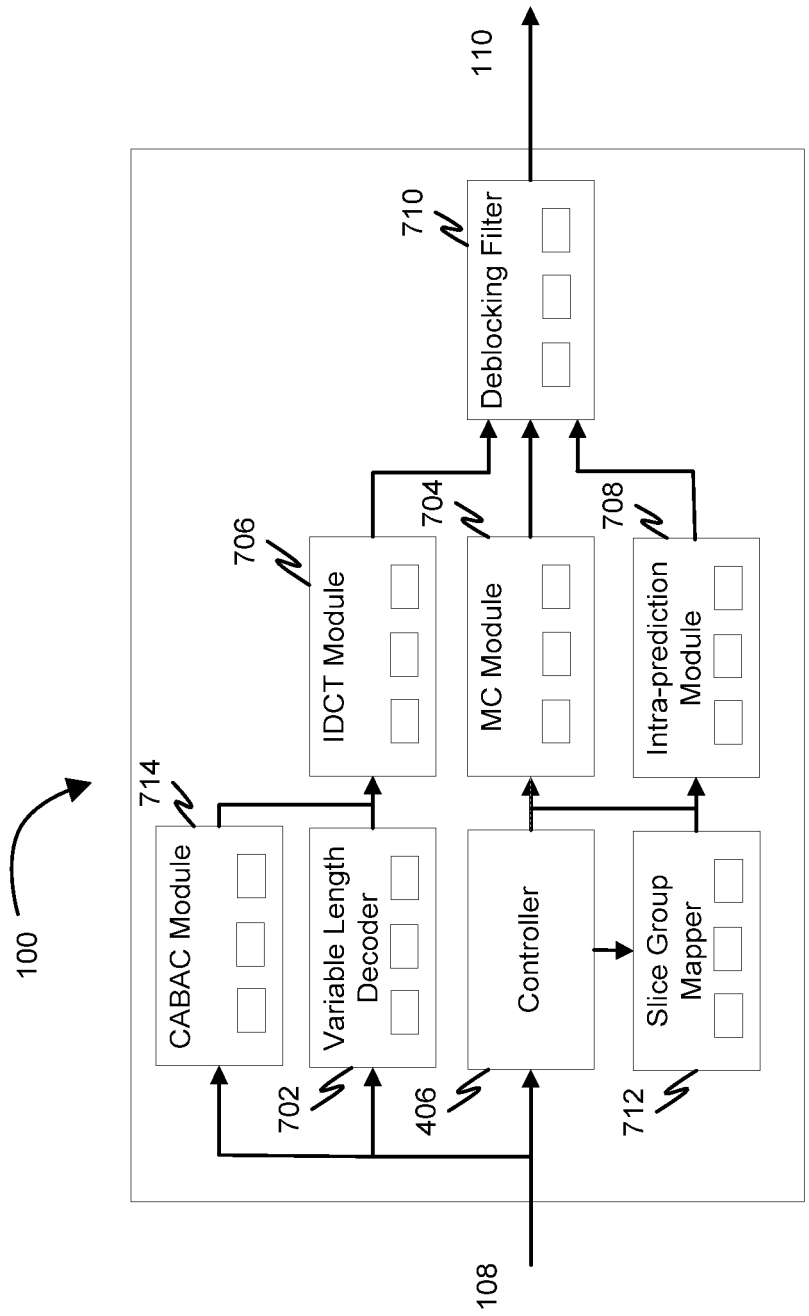

FIG. 7A and FIG. 7B illustrates an exemplary embodiment of a video decoder for a runtime transition from decoding a MPEG2 video stream to decoding a H.264 video stream. As depicted in FIG. 7A and FIG. 7B, decoder 100 includes a Variable Length Decoder (VLD) 702, a Motion Compensation (MC) module 704, an Inverse Discrete Cosine Transform (IDCT) module 706, an intra prediction module 708, a Deblocking Filter 710, a Slice group mapper 712, and a Context-Adaptive Binary Arithmetic Coding (CABAC) module 714, required to support MPEG1, MPEG2, MPEG4-ASP, H.263, H.264 AVC, H.264 SVC, WMV9 and M-JPEG video types. As explained earlier in conjunction with FIG. 2, VLD 702, MC module 704, IDCT module 706, intra prediction module 708, deblocking filter 710, slice group mapper 712, and CABAC module 714, include one or more tiles based on a corresponding decoding sub function performed.

In an instance, if incoming video stream 108 is identified to be of video type MPEG2, controller 406 identifies VLD 702, MC module 704, and IDCT module 706 to decode the MPEG2 video stream. Each of VLD 702, MC module 704, and IDCT module 706 execute a corresponding decoding sub function required to decode the MPEG2 video stream.

Thereafter, controller 406 provides a plurality of configuration parameters associated with MPEG2 video type to each of VLD 702, MC module 704, and IDCT module 706. The plurality of configuration parameters are input to each tile of one or more tiles in each of VLD 702, MC module 704, and IDCT module 706. Thereafter, each of VLD 702, MC module 704, and IDCT module 706 are configured based on the plurality of configuration parameters of the MPEG2 video type as illustrated in conjunction with FIG. 3 and FIG. 4. Upon configuration, VLD 702, MC module 704, and IDCT module 706 work in conjunction with each other to decode video stream 108 to obtain decoded video stream 110 as shown in FIG. 7A.

If video stream 108 changes from MPEG2 video type to H.264 video type, video decoder 100 is reconfigured at runtime to support video stream 108 of the H.264 video type based on the plurality of configuration parameters of the H.264 video type. In order to decode video stream 108 of the H.264 video type, VLD 702, MC module 704, IDCT module 706, intra prediction module 708, deblocking filter 710, slice group mapper 712, and CABAC module 714 are identified by controller 406 as being required to decode video stream 108 of the H.264 video type. Intra prediction module 708, deblocking filter 710, slice group mapper 712, and CABAC module 714 are now invoked by controller 406 to execute additional decoding sub functions corresponding to the H.264 video type over the MPEG2 video type. VLD 702, MC module 704, and IDCT module 706 used for decoding the MPEG2 video stream are retained. However, VLD 702, MC module 704, and IDCT module 706 are modified based on the plurality of configuration parameters of the H.264 video type. Thereafter intra prediction module 708, deblocking filter 710, slice group mapper 712, and CABAC module 714 are configured to suit the requirements of the H.264 video type based on the plurality of configuration parameters of the H.264 video type. Upon configuration, VLD 702, MC module 704, IDCT module 706, intra prediction module 708, deblocking filter 710, slice group mapper 712, and CABAC module 714 work in conjunction with each other to decode video stream 108 to obtain decoded video stream 110 as shown in FIG. 7B.

The invention provides a method and a SoC for adapting a runtime reconfigurable hardware to decode a video stream of a video type. The SoC of the invention provides a set of functional blocks corresponding to a plurality of decoding sub functions required for decoding a plurality of video types. Further, the invention provides a method for configuring each functional block of the set of functional blocks for adapting to a video type of the plurality of video types. Therefore, the invention provides hardware solution for decoding video streams in terms of scalability and interoperability between various video types.

In the foregoing specification, specific embodiments of the invention have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the dependency of this application and all equivalents of those claims as issued.

What is claimed is:

1. A method for adapting a runtime reconfigurable hardware on a single physical chip to decode a video stream, wherein the video stream is a plurality of video types, the method comprising, during the runtime:
   determining a first video type of the video stream;
   loading first configuration parameters associated with the first video type;
   identifying a set of functional blocks in the runtime reconfigurable hardware in response to determining the video type, wherein a functional block corresponds to a decoding sub function of the video type;
   configuring the set of functional blocks based on the first configuration parameters of the first video type;
   configuring intercommunications among members of the set of functional blocks according to the first configuration parameters;
   decoding the first video type of the video stream using the set of functional blocks;
   determining a second video type of the video stream;
   loading second configuration parameters associated with the second video type;
   reconfiguring at least some of the same set of functional blocks based on the second configuration parameters of the second video type;
   reconfiguring intercommunications among members of the set of functional blocks according to the second configuration parameters;
   and
   decoding the second video type of the video stream using the same set of functional blocks.

2. The method of claim 1, wherein a video type of the plurality of video types is one of MPEG1, MPEG2, MPEG4-ASP, H.263, H.264 AVC, H.264 SVC, WMV9 and M-JPEG.

3. The method of claim 1, wherein a functional block comprises at least one tile, a tile of the at least one tile comprises at least one of at least one compute element, at least one storage element, and at least one communication element.

4. The method of claim 3, wherein one or more tiles are reconfigurable during runtime to comprise one of a bit stream parser, an entropy decoder, an inverse quantizer, an inverse transform unit, a spatial prediction unit, a motion compensation unit, an artifact filter, an image resize unit, a frame buffer, and a memory controller.

5. The method of claim 3, wherein a tile of the at least one tile further comprises a control unit to independently control functioning of the tile.

6. The method of claim 3, wherein the configuring the at least one functional block comprises modifying intercommunications among tiles in a functional block of the at least one functional block.

7. The method of claim 6, wherein the configuring at least one functional block further comprises dynamically sizing at least one storage element of at least one tile of a functional block.

8. The method of claim 1, wherein the configuring the at least one functional block comprises modifying intercommunications among a plurality of functional blocks of the at least one functional block.

9. A system on a chip (SoC) for adapting a runtime reconfigurable hardware during the runtime to decode a video stream, wherein the video stream is a plurality of video types, the SoC comprising:
   a memory;
   functional blocks wherein each functional block corresponds to a decoding sub function of at least one of the plurality of video types;
   a controller coupled to the memory, the controller configured to:
      determine each video type of the plurality of video types;
      identify a set of the functional blocks associated with each video type;
      modify intercommunications between the functional blocks based on configuration parameters of each video type; and
      decode the video stream via reconfiguring the set of functional blocks during the runtime and reconfiguring the intercommunications between the functional blocks during the runtime for each video type.

10. The SoC of claim 9, wherein a functional block comprises tiles, each tile comprising at least one of a compute element, a storage element, and a communication element.

11. The SoC of claim 10, wherein each tile further comprises a control unit configured to:
   modify intercommunications among tiles in the functional block based on the configuration parameters of the video type;
   establish synchronization among at least one compute element and at least one storage element of each tile; and
   dynamically size at least one storage element based on the configuration parameters of the video type.

12. A method of configuring hardware on a single chip to decode a video stream during a decoding runtime, wherein the video stream is a plurality of video types, the method comprising:
   describing each decoding sub function of each of the video types in a high level language (HLL);
   compiling the HLL description of each decoding sub function to identify a plurality of mapping parameters corresponding to each decoding sub function,
   wherein the plurality of mapping parameters describes at least one of functionality of a decoding sub function, and data flow path of a decoding sub function;
   mapping each decoding sub function to the hardware based on corresponding plurality of mapping parameters; and
   remapping each decoding sub function to the hardware and remapping each data flow path of each decoding sub function to the hardware for each change of the video type during the decoding runtime of the video stream.

13. The method of claim 12, wherein the hardware comprises tiles, each tile comprising at least one compute element, at least one storage element, and at least one communication element.

* * * * *